(12) United States Patent
Teichner

(10) Patent No.: US 7,748,019 B1
(45) Date of Patent: Jun. 29, 2010

(54) LOCAL NETWORK IN A VEHICLE

(75) Inventor: Detlef Teichner, Koenigsfeld (DE)

(73) Assignee: XSYS Interactive Research GmbH, Villingen-Schwenningen (DE)

(*) Notice: Subject to any disclaimer, the term of this patent is extended or adjusted under 35 U.S.C. 154(b) by 0 days.

(21) Appl. No.: 09/890,315

(22) PCT Filed: Jan. 20, 2000

(86) PCT No.: PCT/EP00/00419

§ 371 (c)(1),
(2), (4) Date: Jan. 9, 2002

(87) PCT Pub. No.: WO00/44590

PCT Pub. Date: Aug. 3, 2000

(30) Foreign Application Priority Data

Jan. 28, 1999 (DE) .................................. 199 03 266

(51) Int. Cl.
*H04N 7/18* (2006.01)
(52) U.S. Cl. .............................. 725/75; 725/76; 725/77; 725/82; 725/85
(58) Field of Classification Search ............. 725/75–78, 725/94–96, 82, 85
See application file for complete search history.

(56) References Cited

U.S. PATENT DOCUMENTS

| | | | | |
|---|---|---|---|---|
| 4,310,849 A | * | 1/1982 | Glass | 348/53 |
| 4,866,515 A | | 9/1989 | Tagawa et al. | 358/86 |
| 5,121,205 A | * | 6/1992 | Ng et al. | 348/568 |
| 5,485,459 A | | 1/1996 | Van Steenbrugge | 3/2 |
| 5,596,647 A | * | 1/1997 | Wakai et al. | 381/77 |
| 5,808,660 A | * | 9/1998 | Sekine et al. | 725/76 |
| 5,898,695 A | * | 4/1999 | Fujii et al. | 370/464 |
| 5,940,398 A | * | 8/1999 | Stiegler et al. | 370/424 |
| 6,025,654 A | * | 2/2000 | Roppel et al. | 307/10.1 |
| 6,058,288 A | * | 5/2000 | Reed et al. | 455/3.06 |
| 6,097,435 A | * | 8/2000 | Stanger et al. | 375/240.03 |
| 6,236,805 B1 | * | 5/2001 | Sebestyen | 386/98 |
| 6,262,776 B1 | * | 7/2001 | Griffits | 348/512 |
| 2001/0014207 A1 | * | 8/2001 | Kawamura et al. | 386/95 |

* cited by examiner

*Primary Examiner*—John W Miller
*Assistant Examiner*—Sumaiya A Chowdhury
(74) *Attorney, Agent, or Firm*—O'Shea Getz P.C.

(57) ABSTRACT

A vehicle-hosted local network includes a subscriber data source that transmits audio data and compressed video data to respective subscriber data sinks on the network. The subscriber data source includes a demultiplexer that separates compressed audio data and compressed video data contained in one compressed source signal. A pre-processing circuit processes in parallel the separated audio data and the separated video data to provide the audio data and the compressed video data that is transmitted to the respective subscriber data sinks on the network.

17 Claims, 1 Drawing Sheet

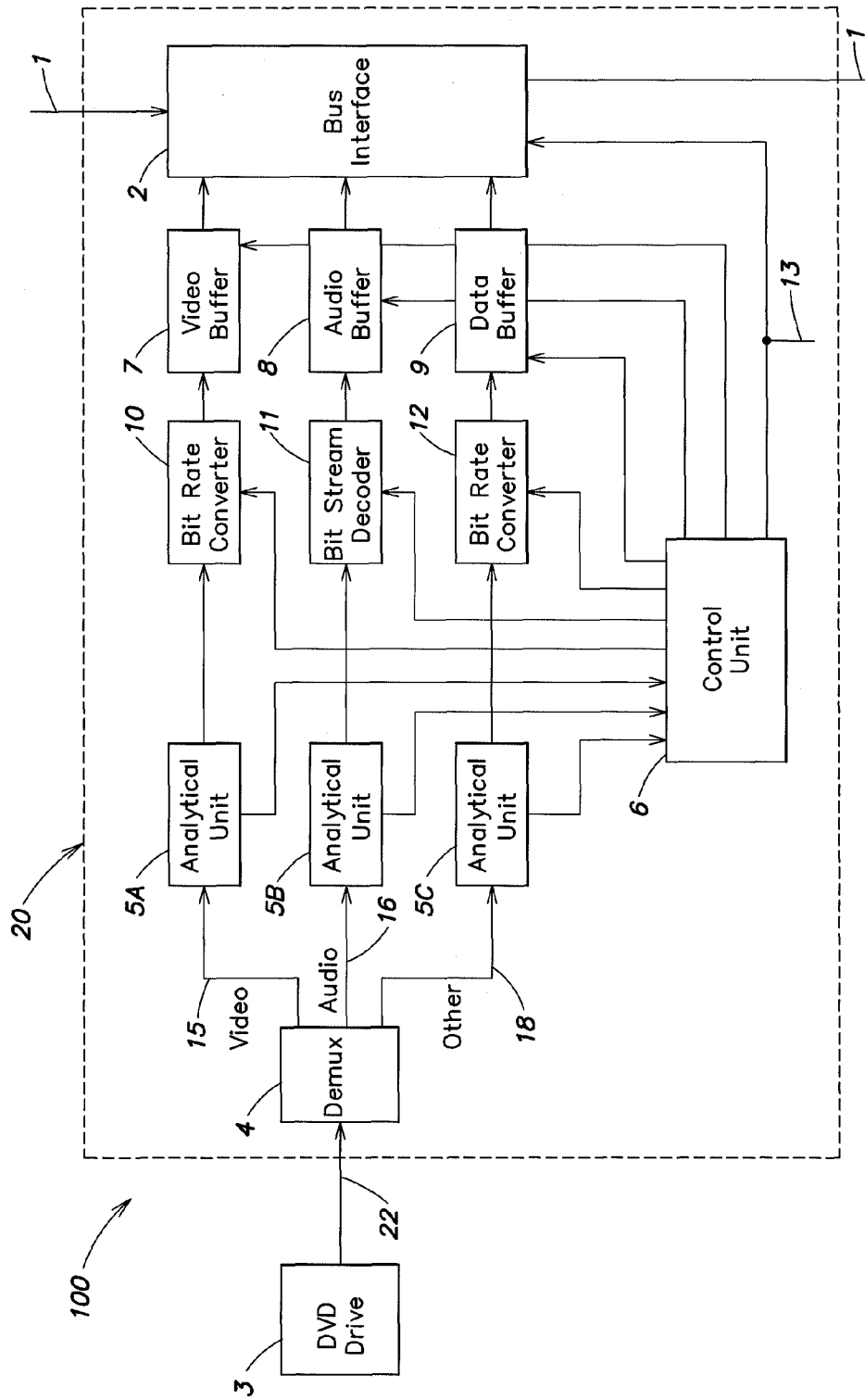

LOCAL NETWORK IN A VEHICLE

BACKGROUND OF THE INVENTION

This invention relates generally to local networks in a vehicle and, more particularly, to efficiently transmitting data over a local network in a vehicle with several network subscribers distributed over the vehicle.

The implementation of a local network in a vehicle is well known. One conventional approach to using a local network in a vehicle is disclosed in German Patent Specification DE 195 03 213 C1. Typically, such local networks have several network nodes, referred to herein as subscribers. Some of the subscribers generate audio data, video data, and control data, and transmit the data over the network. Such subscribers are referred to herein as data sources. Other subscribers on the network receive data from the network and reproduce the data. Such data reproduction can be, for example, an acoustic or visual reproduction. These subscribers are referred to herein as data sinks.

Such conventional vehicle-hosted local networks have various equipment that serve as data sources. Examples of such equipment include, for example, a car radio, CD player, video recorder, TV tuner, etc. Such devices conduct their data uncompressed to appropriate data sinks via a data line of the network. The data sinks can be, for example, an audio amplifier to which several loudspeakers are connected, or a display screen which displays an uncompressed BAS video signal. Typically, the video and audio data are transmitted separately and concurrently. For example, a TV tuner data source transmits audio, video and control data over the local network. The video data are transmitted to a screen, in the manner described above, as uncompressed FBAS video signals. In parallel to this, the audio data are transmitted to an audio amplifier as uncompressed audio data and are reproduced as acoustic signals. Typically, the audio and video data are transmitted in a format that prescribes a clocked sequence of individual bit groups of the same length. In these bit groups, specific bit positions for transmission from the data source to the data sink are prescribed for the audio and video data, together referred to as real-time-relevant source data. Real-time-relevant source data are not accessible to an interruption of the data flow. Specific bit positions are also prescribed for the control data, if present. The bit positions for the source data are collected together in several connected partial picture groups, by means of which the specific audio and video data of a data source are transmitted in parallel to an associated data sink. This transmission is organized by control data that are transmitted in parallel with the audio and video data. The subscribers on such a network can input their data into the network or take their data from it independently of one another and sometimes simultaneously. Such a network can accommodate only a few subscribers, since the transmission capacity of the network over the data line is limited.

What is needed, therefore, is a local network for use in a vehicle that substantially utilizes the maximum transmission capacity while maintaining the quality of data display in the data sinks.

SUMMARY OF THE INVENTION

Briefly, according to an aspect of the invention, a vehicle-hosted local network is disclosed. The network includes a subscriber data source that transmits in parallel audio data and compressed video data to respective subscriber data sinks on the network.

In another aspect of the invention, a method for pre-processing a compressed signal generated by equipment for transmitting audio and video data over a local network implemented in a vehicle is disclosed. The method includes separating compressed audio and compressed video data contained in the compressed signal, and parallel processing the compressed audio data and the compressed video data such that time differences in the reproduction of correlated audio data and video data are minimized.

In a further aspect of the invention, a local network in a vehicle with several subscribers distributed over the vehicle is disclosed. The subscribers form data sources and data sinks which are connected with one another by a data line to transmit audio, video and control data. The audio, video, and control data are transmitted in a format which prescribes a clocked sequence of individual bit groups of the same length, in which certain bit positions are provided respectively for the audio, video, and control data. The bit positions for the audio or video data respectively are collected together in several connected component bit groups, and the data assigned to these component bit groups are assigned by transmitted control signals to a certain data source or data sink. Included in the network is a data source for compressed audio and video that includes a demultiplexer to separate the compressed audio and compressed video data contained in one compressed signal, a bit stream decoder to decode the compressed audio data, an audio buffer for intermediately storing the separated audio data, a bit rate converter to recode the compressed video data, a video buffer for intermediately storing the separated video data, a bus interface that inserts the delayed, decoded audio data and the delayed, recoded video data from the data source into their intended component bit groups, and a control unit that is connected to the audio buffer and the video buffer, and which specifies and controls the adjustable intermediate storage time of the buffers.

These and other objects, features and advantages of the present invention will become apparent in light of the following detailed description of preferred embodiments thereof, as illustrated in the accompanying drawings.

BRIEF DESCRIPTION OF THE DRAWING

The sole FIGURE is a block diagram of a subscriber data source for transmitting over a local network implemented in a vehicle in accordance with one embodiment of the present invention.

DETAILED DESCRIPTION OF THE INVENTION

The present invention is directed to a local network for use in a vehicle that includes a subscriber data source that transmits compressed audio and video data. The subscriber data source includes equipment that generates a compressed source signal that includes audio, video and, possibly, other types of data. In addition, the subscriber data source includes a circuit that pre-processes separately and in parallel the compressed, data components (audio, video, other) in the compressed source signal. The circuit has a demultiplexer that separates the compressed audio and compressed video data contained in the compressed source signal. The separated compressed audio and video data are processed separately. The compressed audio data are conducted to a bit stream decoder for decoding. The bit stream decoder converts the audio data into an uncompressed format such as for example a PCM format. An audio buffer for the intermediate storage of the separated audio data is associated with the bit stream decoder. The intermediate storage time of this audio buffer can be varied by appropriate control instructions. The compressed video data, separated previously from the audio data by the demultiplexer, are conducted for recoding to a bit rate converter, which accomplishes a data reduction of the video data. The scope of this reduction is performed in accordance with the resolution and size of the display in the data sink. In this way, it becomes possible that the extent of the compressed video data that is transmitted across the network is markedly reduced. Since the extent of reduction is based on the requirements of the data sink, the display quality of the video data is not adversely affected. A video buffer, whose intermediate storage time can be adjusted by a control instruction, is associated with this bit rate converter.

The intermediately stored, decoded audio data and the intermediately stored, recoded video data are conducted to a bus interface, which combines the data into component picture groups for parallel transmission over the local network to their respective data sink. The intermediate storage time of the buffers is controlled by a control unit in the pre-processing circuit in such a way that time differences in the reproduction of the correlated audio data and video data are reduced and, preferably, completely eliminated. Such time differences can occur, for example, due to a different length of time required to complete the processing operations performed in the bit stream decoder and in the bit rate converter. It is thus assured that the correct sound for a picture is transmitted at the proper time relative to the display. It thus becomes possible to improve the quality of the data transmitted from the data source for both the audio and video data in a mutually coordinated manner.

The specific design of the transmission of the data-reduced, compressed video data and the uncompressed audio data over the data line additionally achieves an advantageous compromise between the requirements of economy of the local network and its optimized transmission capacity. According to an aspect of the invention, the audio data are transmitted in an uncompressed form, thus providing an economical design for the data sink for audio data. However, in view of the very extensive quantities of video data, even in spite of data reduction, compressed transmission is chosen. As a result, the data sink for video data must be equipped with a corresponding decoder module. However, in view of the improved utilization of the data transmission capacity, this is compensated by the transmission of the compressed, reduced video signal.

In addition to the compressed audio data and video data, the data source equipment can also receive other compressed data or take such data from a data medium, such as, for example, a DVD (digital versatile disc) player. Such a DVD player can read, in its playback unit, the compressed signals stored on a DVD disc, and by a demultiplexer can divide these data into the components of compressed audio data, compressed video data, and compressed "other" data, and can conduct these to specific, separate processing units. In the manner described, the compressed audio data and the compressed video data are put into intermediate storage and are decoded or recoded respectively, while the other compressed data are conducted to a second bit rate converter for recoding, and furthermore these data are conducted along the data path to a data buffer for intermediate storage of these separated data. After the various types of data have been separately processed, they are all conducted to a bus interface, which inserts the various data into appropriate, separate component picture groups for transmission, via the data line, to their respective data sink. The data buffer is controlled by the control unit in correspondence with the audio buffer and the video buffer, and the variable intermediate storage time is thus specified. By specifying the intermediate storage time of the respective buffers, the time differences in the display of the data, which have resulted for the compressed audio, video, and other data along their path from the antenna or from the storage medium or from a feed line from the data source are at least partly compensated. Typical examples of other compressed data are information regarding the so-called subpictures, as these are known from the DVD. Through this triple division of the compressed signals, it is assured that all the various data are delayed in their time progress specifically and differently, for example in accordance with the respective processing time, so that the audio data, video data, and other data are displayed as simultaneously as possible, for example as subpictures in the individual data sinks.

It has proven advantageous to situate the buffers directly before the interface, that is after the bit rate converter or decoder. This assures that all time differences generated before the intermediate storage, especially the time differences formed in the decoder and the bit rate converters are at least partly compensated before the data are inserted into the component picture groups through the bus interface. This control is designed as a type of forward control, resulting in a very simple, secure, and economical controlled structure.

In addition, it is also possible to situate the buffers directly behind the demultiplexer and before the respectively associated bit stream decoder or bit rate converter. This assures that the various data can be transmitted completely or largely time-corrected already while the compressed data are further processed in the bit rate converter or the audio decoder. This design proves to be especially advantageous if the control unit controls not only the buffers but also the bit rate converters and the audio decoder in such a way that these are enabled to perform a possibly needed slight compensation of existing time differences. Such a compensation can be effected, for example in the case of data from a DVD player, by means of the so-called time stamps associated with the data.

According to a preferred embodiment of the invention, analytical units are situated in the pre-processing paths for the audio data, the video data, and the other data. These units provide the respective present relative delays resulting from the different processing or modification of the data in their individual paths, and interacting with the control unit the delay times in the individual buffers or in the bit rate converters or the bit stream decoders are set in accordance with the presently observed conditions. This makes it possible to react specifically to the most various situations. For example, if no sound or only a stationary picture or only simple numeric characters are being transmitted, the data quantities to be processed and transmitted change, so that different processing times for one and the same data type can occur. These changes are taken into account through the present design of the invention.

It has proven especially advantageous to design the network with an optical data line. With this design, the maximum data quantity that can be transmitted by the network is nearly independent of the theoretically maximum transmission capacity of the data line, since this capacity typically cannot be exhausted by a local network for an automotive application. Consequently, the limited data transmission capacity of the data line need not be taken into account.

The bit rate converter for the compressed video data preferably is connected to the control unit, and can be controlled in such a way that the scope of data reduction during the bit rate conversion can be adjusted based on the quantity of data that can be displayed by the data sink.

As the scope of data reduction varies, the processing time for the bit rate converter to perform the operations also varies. Depending on the resolution and/or the size of the display in the data sink and, thus, the display capabilities of the display, the required delay time of the individual data types is chosen accordingly. The transmission of the relevant information about the display in the data sink to the control unit via the local network data line enables the control unit to control the bit rate converter for the video data and/or the corresponding delay elements in such a way that the various data are displayed without significant time discrepancy.

According to one embodiment of the invention, at least one data sink for the data transmitted from the data source via the data line is equipped with a buffer for intermediate storage of the received data. The intermediate storage time of this buffer depends on a control signal that is transmitted from the data source via the local network data line. Thus, the time progress of the data can be corrected not only in the data source but also in the data sink. In this way, it is possible to correct systematic delays for data associated with a particular data sink by means of a buffer situated in this data sink. A correction in the data source or in another data sink is thus not necessary. Accordingly, systematic differences in the data sources can be corrected by such a buffer in the respective data sink.

A block diagram of an embodiment of the inventive data source is illustrated in the FIGURE. A local network has a plurality of subscribers connected to each other over an optical data line 1 to form a ring network. Each subscriber has a bus interface 2 with two connections to the optical data line 1. The subscriber illustrated in the FIGURE represents a data source, and is referred to herein as the subscriber data source 100. The subscriber data source 100 includes, in this exemplary embodiment, a DVD drive 3 that generates a compressed source signal on a line 22. The compressed signal on the line 22 includes a combination of audio data, video data, and other data stored on a DVD disc. The compressed audio, video and other data components are processed separately and provided to the bus interface 2 for transmission to the appropriate data sinks connected to the optical data line 1 that are associated with the subscriber data source 100. The compressed audio, video, and other data, which have been read out from the DVD drive 3, are presented as the compressed source signal on the line 22. These components of the compressed source signal are separated out of the compressed source signal in a demultiplexer 4 that is part of a pre-processing circuit 20. Each type of data is conducted to a specific processing path in the circuit 20 for separate, coordinated processing.

The compressed video data on a line 15, separated off by the demultiplexer 4, are conducted to a well-known analytical unit 5A configured to analyze video data as a multiple video packet-sized elementary stream. The analytical unit 5A analyzes the extent and type of compressed video data on the line 15 to be processed, and conducts the result of this analysis to a control unit 6. As one of ordinary skill in the art would find apparent, the compressed video data are not changed by the analytical unit 5A. Once analyzed, the compressed video data are conducted to a bit rate converter 10 that recodes the compressed video data from the source of the compressed signal, here, the DVD disc 3. In one application, the compressed video data are formatted in the bit rate converter 10 in accordance with the MPEG-2 video standard and have variable bit rates up to 10 megabit/s. During the recoding, a data reduction occurs, which is guided in accordance with the properties of the data sink and, in particular, to the size and resolution of the display in the data sink. The information regarding the size and resolution is conducted to a control unit 6 via a control line 13, and is converted into appropriate control instructions to control the bit rate converter 10. Since the MPEG-2 video data are designed for display on a large high-resolution screen, and since such high-resolution large screens find no application in a vehicle, the data reduction described above can discard the majority of the compressed video data by as much as 75%, with the remaining video data being transmitted to the appropriate data sink. It should be noted that this reduction in video data does not noticeably affect the display of the video data in the data sink. The recoded, data-reduced, compressed video data are then conducted to a video buffer 7 as packet-sized elementary streams. Under the control of the control unit 6, the video buffer 7 can change the intermediate storage time and thus the delay time. The delayed video data are then conducted to the bus interface 2. The bus interface 2 writes the video data into appropriate component picture groups for transmission to a corresponding data sink.

The pre-processing circuitry 20 processes compressed audio data in a manner similar to the compressed video data discussed above. The compressed audio data are conducted on a line 16 from the demultiplexer 4 to a corresponding audio data path in the circuit 20, which is constructed separately from the compressed video data path. The compressed audio data, like the video data, are conducted to an analytical unit 5B, which investigates the extent and type of the audio data. The analytical unit 5B conducts the result of its analysis operations by the control unit 6. The unchanged, compressed audio data, which are present in a DVD disk 3, for example in accordance with the Dolby digital compression process, are decoded by a bit stream decoder 11. The bit stream decoder 11 is preferably constructed as a Dolby digital decoder, and converts the compressed audio signals into uncompressed PCM signals, which make possible Surround Sound (5+1 channels). The uncompressed audio data are then conducted to an audio buffer 8. The audio buffer 8 is connected to and can be controlled by the control unit 6 in such a way that the intermediate storage time, and thus the delay time, of the uncompressed audio data can be changed.

In corresponding fashion, the compressed "other" data, which were previously separated by the demultiplexer 4 from the other data components in the compressed source signal on the line 22 are assigned to a data line 18 that is part of a data path that is separate from the video and audio data paths through the circuit 20. This data path correspondingly has an analytical unit 5C, another bit rate converter 12, and a data buffer 9. The components of the "other" data path have the corresponding functionalities as the components of the video and audio data paths.

From the three analytical units 5A-5C, the control unit 6 obtains information regarding the expected relative time delays resulting from the different processing times in the individual data paths. Based on this information, the respective delay times of the individual buffers 7, 8, 9 are chosen. Also, the bit rate converter 10 for the compressed video data and the Dolby digital decoder 11 for the compressed audio data, as well as the other bit rate converter 12 for the compressed other data, are driven by the control unit 6 in such a way that their processing occurs slightly later or earlier. A time correction is also performed by the time stamps contained in the compressed data. The time stamps themselves can also be read out from the bit stream, changed, and can again be inserted into the bit stream for a subsequent correction.

This inventive separation of the various data components and their concurrent yet specific processing, including the specific delay times dependent thereon, more closely harmonize the mutually correlated data. These are then transmitted via the bus interface 2 to the data line 1, and to the respective data sinks, that is other subscribers of the network, which are accommodated separately from the data source at another place in the vehicle. The inventive design with the correction of the time differences due to the different processing times of the various data types succeeds in displaying the correlated data largely or completely synchronously. This ensures that a tone reproduced by a sound system matches a picture reproduced on a display in the motor vehicle. This raises the level of the visual and acoustic reproduction quality of the local network with its subscribers. Furthermore, the transmission capacity of the network is used very efficiently, since, depending on the data type, compressed, data-reduced transmission forms and uncompressed data forms are transmitted simultaneously.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A local network in a vehicle with several subscribers distributed over the vehicle, which form data sources and data sinks and which are connected with one another by a data line to transmit audio, video and control data, such that the audio, video, and control data are transmitted in a format which prescribes a clocked sequence of individual bit groups of the same length, in which certain bit positions are provided respectively for the audio, video, and control data, and the bit positions for the audio or video data respectively are collected together in several connected component bit groups, and the data assigned to these component bit groups are assigned by transmitted control signals to a certain data source or data sink, at least one data source being present for audio and video data and at least one data sink being present for the audio and video data transmitted over the data line, where the at least one data source comprises:
  a data source for compressed audio and video digital data, where the bit positions for the audio or video data are collected together in several connected component bit groups, the data source including
    a demultiplexer to separate the compressed audio and compressed video data contained in one compressed signal;
    a bit stream decoder that decodes the separated audio data to provide decompressed audio data;
    an audio buffer for intermediately storing the decompressed audio data and providing buffered decompressed audio data;
    a bit rate converter to selectively recode the compressed video data in response to a bit rate control signal to provide recoded video data;
    a video buffer for intermediately storing the recoded video data;
  a bus interface that inserts the decompressed audio data and the buffered recoded video data into the corresponding component bit groups, and receives a data sink video characteristic signal and provides a received data sink video characteristics signal; and
  a control unit that is connected to the audio buffer and the video buffer, and which specifies and controls the adjustable intermediate storage time of the audio and video buffers, and in response to the received data sink, characteristics signal provides the bit rate control signal.

2. The local network of claim 1, where
  the data source for compressed audio and video data comprises a data source for other compressed data, where the demultiplexer separates the other compressed data from the compressed audio data and the compressed video data, and where the data source further comprises,
    a second bit rate converter for recoding the other compressed data, and
    a data buffer for intermediately storing the separated other data, and where the bus interface inserts the decoded audio data, the recoded video data, and the recoded other data into the corresponding component bit groups.

3. The local network of claim 2, further comprising analytical units associated with the bit stream decoder and the bit rate converters, where the analytical units determine a time relation of the compressed video data with respect to the compressed audio data, and where the analytical units are connected to the control unit to specify the intermediate storage times of the audio, video and other buffers.

4. The local network of claim 2, where the control unit controls the bit stream decoder and the bit rate converters to synchronize the time relation between the decoded audio data, the recoded video data and the recoded other data.

5. The local network of claim 2, where the bit rate converter that recodes the compressed video data is connected to the control unit, and where the control unit controls the bit rate converter for the compressed video data to control an amount of data reduction during a bit rate conversion process performed by the bit rate converter in dependence on one of the resolution and the size of a display in the associated data sink for video data.

6. The local network of claim 1, where at least one of the audio and video buffers is situated before the bus interface.

7. The local network of claim 1, where at least one of the audio and video buffers is operationally interposed between the demultiplexer and the bit stream decoder and the bit rate converter associated with the audio and video buffers.

8. The local network of claim 1, where the data line comprises an optical data line.

9. The local network of claim 1, where the bit stream decoder decodes the compressed audio data by converting the compressed audio signal into a PCM audio signal.

10. The local network of claim 1, where the data source comprises a DVD player.

11. The local network of claim 1, where at least one data sink for the data transmitted from the data source via the data line comprises a buffer for the intermediate storage of the received data, where an intermediate storage time of the data sink buffer is adjusted as a function of a control signal transmitted from the data source via the data line.

12. A vehicle-hosted local network comprising:
  a subscriber data source that transmits audio digital data and compressed digital video data where the bit positions for the audio or video data are collected together in several connected component bit groups to respective subscriber data sinks on the network, where the subscriber data source includes a demultiplexer that separates compressed audio data and compressed video data contained in one compressed source signal and a pre-processing circuit that processes in parallel the separated audio data and the separated video data to provide decompressed audio data and the compressed video data, where a control unit receives a data sink video characteristic signal and provides a received data sink video characteristics signal to a video hit stream converter that processes the compressed video signal in accordance with the data sink video characteristics signal to reduce the bit rate of the compressed video signal and provide a reduced bit rate video signal, where the reduced bit rate video signal and the decompressed audio signal are output to a data sink on the network.

13. The vehicle-hosted local network of claim 12, where the subscriber data source comprises:
   a device that generates the compressed source signal.

14. The vehicle-hosted local network of claim 12, where the pre-processing circuit comprises:
   a demultiplexer that separates the compressed audio data and the compressed video data contained in the compressed source signal;
   an audio data processing path that decodes the compressed audio data into an uncompressed format and generates decoded audio data in response to control instructions;
   a video data processing path that recodes the compressed video data to selectively reduce the quantity of video data in response to the data sink video characteristic signal, and generates the reduced bit rate video signal; and
   a bus interface that combines the decompressed audio data and the reduced bit rate video signal into component picture groups for parallel transmission over the local network to their respective data sinks, and receives a control signal and provides the data sink video characteristics signal.

15. The vehicle-hosted local network of claim 14, where the audio data processing path comprises:
   a bit stream decoder for decoding the separated compressed audio data, and for converting the audio data into an uncompressed format; and
   an audio buffer for storing the separated audio data for an intermediate time determined by at least one of the control instructions.

16. The vehicle-hosted local network of claim 14, where the video data processing path comprises:
   a bit rate converter for recoding the compressed video data to reduce the quantity of video data; and
   a video buffer for storing the separated video data for a time determined by at least one of the control instructions.

17. The vehicle-hosted local network of claim 12, where the subscriber data source comprises:
   a device that generates the compressed source signal including compressed audio data and compressed video data; and where the pre-processing circuit separately processes the compressed audio data and the compressed video data to generate uncompressed audio data and a reduced quantity of compressed video data.

* * * * *

UNITED STATES PATENT AND TRADEMARK OFFICE
CERTIFICATE OF CORRECTION

PATENT NO. : 7,748,019 B1  Page 1 of 1
APPLICATION NO. : 09/890315
DATED : June 29, 2010
INVENTOR(S) : Detlef Teichner It is certified that error appears in the above-identified patent and that said Letters Patent is hereby corrected as shown below:

Column 8
Line 63, delete "hit" and insert --bit--

Column 9
Line 1, delete "hit" and insert --bit--

Signed and Sealed this

Twenty-fourth Day of August, 2010

David J. Kappos
*Director of the United States Patent and Trademark Office*